(12) United States Patent
Davidian

(10) Patent No.: US 12,539,545 B2
(45) Date of Patent: Feb. 3, 2026

(54) RAPID CHANGE CHUCK ADAPTER

(71) Applicant: Seth Davidian, La Crescenta, CA (US)

(72) Inventor: Seth Davidian, La Crescenta, CA (US)

( * ) Notice: Subject to any disclaimer, the term of this patent is extended or adjusted under 35 U.S.C. 154(b) by 470 days.

(21) Appl. No.: 17/719,945

(22) Filed: Apr. 13, 2022

(65) Prior Publication Data

US 2022/0379388 A1 Dec. 1, 2022
US 2023/0093784 A9 Mar. 23, 2023

Related U.S. Application Data

(60) Provisional application No. 63/234,712, filed on Aug. 19, 2021, provisional application No. 63/174,520, filed on Apr. 13, 2021.

(51) Int. Cl.
*B23B 31/20* (2006.01)

(52) U.S. Cl.
CPC ........ *B23B 31/201* (2013.01); *B23B 2231/04* (2013.01); *B23B 2231/2078* (2013.01); *B23B 2231/2083* (2013.01); *B23B 2260/146* (2013.01); *Y10T 279/17529* (2015.01)

(58) Field of Classification Search
CPC .............. B23B 31/201; B23B 2231/04; B23B 2231/2078; B23B 2231/2083; B23B 2260/146; Y10T 279/17529
See application file for complete search history.

(56) References Cited

U.S. PATENT DOCUMENTS

| | | | | |
|---|---|---|---|---|
| 866,788 | A | * | 9/1907 | Holstein ............. B23B 31/1215 279/146 |
| 2,396,006 | A | * | 3/1946 | Hall .................... B23B 31/2072 279/146 |
| 4,943,071 | A | * | 7/1990 | Srebot .................. B23B 31/208 301/124.1 |
| 5,431,416 | A | * | 7/1995 | Thornton ............ B23B 31/2073 279/143 |
| 5,462,294 | A | * | 10/1995 | Wendhack ............. B23Q 3/067 279/143 |
| 5,921,563 | A | * | 7/1999 | Huggins ................ B23B 31/142 279/131 |
| 6,199,462 | B1 | * | 3/2001 | Hallett .............. B23B 31/16283 82/162 |
| 2002/0145261 | A1 | * | 10/2002 | Humphrey .......... B23B 31/2072 279/57 |

FOREIGN PATENT DOCUMENTS

WO    WO-8807904 A  * 10/1988 ........... B23B 31/207

* cited by examiner

*Primary Examiner* — Sunil K Singh
(74) *Attorney, Agent, or Firm* — Crowell & Moring LLP

(57) ABSTRACT

A rapid change chuck adapter system includes a chuck adapter that is removably attachable to the chuck in place of removed chuck teeth. The chuck adapter is operable to engage a collet such that an operation of the chuck as if the chuck teeth were not removed operates the collet via the chuck adapter.

3 Claims, 5 Drawing Sheets

RAPID CHANGE CHUCK ADAPTER

CROSS-REFERENCE TO RELATED APPLICATION

This application claims the benefit of prior of U.S. Provisional Patent Application No. 63/174,520, filed on Apr. 13, 2021, entitled "Rapid Change Chuck Adapter," and U.S. Provisional Patent Application No. 63/234,712, filed on Aug. 19, 2021, entitled "Rapid Change Chuck Adapter True Length Version," each of which is incorporated by reference in its entirety.

FIELD OF THE INVENTION

The present invention relates to chuck adapters, and chuck adapter systems and methods. More particularly, the present invention relates to chuck adaptors useable with lathe and mill computer-numerical-control (CNC) equipment for producing parts in the manufacturing process, which chuck adaptors allow CNC equipment operators to keep the chuck on the CNC equipment while efficiently changing between jaw and collet arrangements.

BACKGROUND OF THE INVENTION

In the manufacturing process, lathe and mill CNC equipment are designed to produce parts. In order to hold stock material to mold, a holding mechanism is necessary to keep the material in place. One particular product is the hydraulic chuck. Similar to how a handheld drill chuck holds a drill bit in place, these large machines require a holding component which holds stock material in place to be machined by the moving drill piece. Standard chucks for CNC lathe machines range from 8-12 inches in diameter and weigh between 50-120 pounds. They are produced with a hard allow steel.

In order to use these chucks, three to four jaws are utilized to hold the stock material, providing the ability to hold larger items. These jaws themselves must be machined in order to fit different diameters. This process takes time and energy. The collet holder (once the chuck is removed) is installed to hold smaller diameter metal stock. There are various diameter collets which are then inserted into the collet holder.

There is a need for an improved chuck adaptor that allows the operator to keep the chuck on the machine and change between jaw and collet seamlessly. There is no current option which achieves the efficiency of the present invention in the industry. In order to change between larger diameter and smaller diameter bars, the entire jaw chuck must be disengaged and removed in order for smaller collet chucks to be used. The downtime required to perform these changes can be long ranging anywhere from half an hour to a full hour depending on the operator's skill and efficiency. The jaw chucks that are to be removed are also very heavy items tucked away in the small window opening of the lathe machine. Worker safety is preserved by avoiding the need to revoke these jaw chucks often. With the present invention, the need to remove these heavy and potentially injury-causing chucks will be significantly reduced.

As mentioned above, in order to use these chucks, three to four jaws are utilized to hold the stock material. Just like the jaws that hold the drill bit on the hand drill. These jaws themselves must be machined to fit different diameters. The jaws only cover a certain range of diameters, which customarily are on the larger side. If during a production run, smaller diameters need to be machined, the jaws are no longer usable. In this situation, the entire chuck must be removed and replaced with a collet holding device. These heavy chucks range between 50-120 pounds, and the confined space of the machine limits this to be completed by only one operator. Once the chuck is removed, then a device called a collet holder has to be installed where the chuck once was. Now, the operator can insert collets into the collet holder, which will then allow the machine to hold mold with small diameters.

It would be desirable to have a chuck adapter that allows the user to switch between the chuck and collet holder seamlessly. It would also be desirable to have a chuck adapter that allows for users to quickly change between different diameters of metal bars during their production runs.

To achieve the foregoing and other objects in accordance with the purpose of the present invention, as embodied and broadly described herein, the apparatus and method of this invention may comprise the following.

SUMMARY OF THE INVENTION

It is accordingly an object of the invention to provide an apparatus for the provision of a rapid change chuck adapter, that allows the chuck to stay on while machining a large array of diameters and eliminating the need to switch between the collet holder and chuck.

The present invention provides an improved chuck adaptor, which allows the operator to keep the chuck on the machine and change between jaw and collet seamlessly. While the present invention is installed, collets can be used. Once it is removed, the user is able to utilize jaws on the chuck. To clarify, with the adapter, the chuck remains on the machine and collets can be used for smaller diameters. For large diameter material, the present invention can be removed. It is important to notes that the installation and uninstalling the present invention takes a fraction of the time the chuck and jaw removal does in the present day, in a matter of seconds.

The invention provides twice the versatility in a fraction of the time, even if an unskilled or untrained operator performs. The invention itself weighs 12 pounds versus an average weight of 50-120 pounds for a chuck. Being one-fifth of the weight and 30 times faster, the present invention provides 150 times of efficiency improvement on average. Not only does the present invention assist by avoiding the removal of the chuck to machine smaller diameters, its benefits are doubled because in order to machine larger diameters, the user must remove the collet holder and replace the chuck. Therefore, machining smaller diameters is a three-step process, which includes the initial removal of the chuck, the placement of the collet holder, then the subsequent reinstallation of the chuck to resume large diameter installation.

The present invention greatly benefits those in the field of manufacturing engineering, primarily those who use lathe machines. The device allows for operators to quickly change between different diameters of metal bars during their production runs. This is achieved by attaching the device to existing jaw chucks with the majority of machine shops already have. The device acts as an adapter which eliminates the current need to constantly adjust soft jaws with different diameters of collet jaws.

Other aspects, features and advantages of the teachings herein are set out in the specific description that follows.

BRIEF DESCRIPTION OF THE DRAWINGS

The features, objects, and advantages of the present invention will become more apparent from the detailed description, set forth below, when taken in conjunction with the drawings, in which like reference characters identify correspondingly throughout and wherein.

DETAILED DESCRIPTION OF THE PREFERRED EMBODIMENTS

Figure 1:
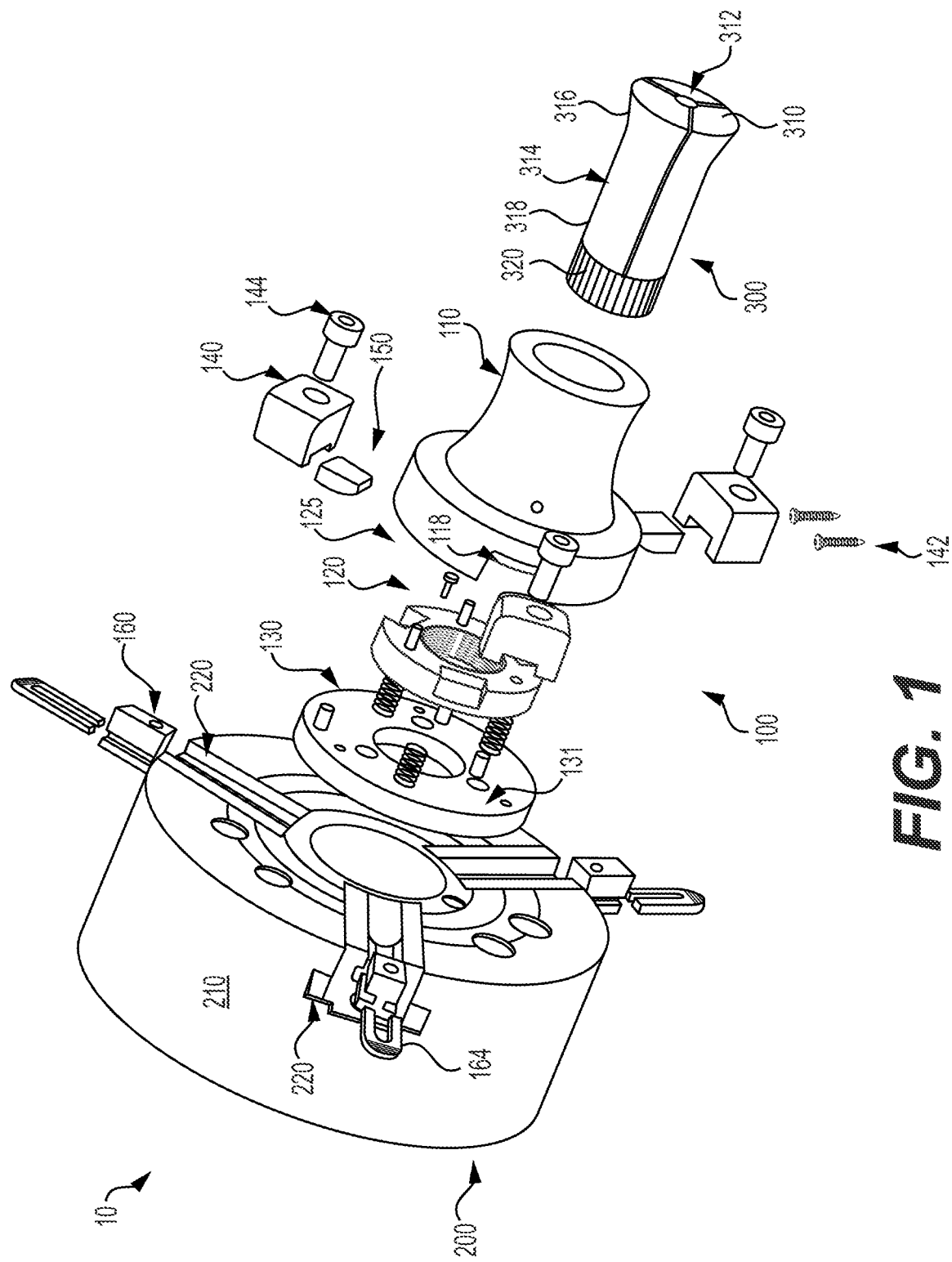
FIG. 1 is a schematic exploded view of an exemplary chuck adapter and hydraulic chuck in accordance with one or more aspects of the present invention.

The above described drawing figures illustrate the present invention in at least one embodiment, which is further defined in detail in the following description. Those having ordinary skill in the art may be able to make alterations and modifications to what is described herein without departing from its spirit and scope. While the present invention is susceptible of embodiment in many different forms, there is shown in the drawings and will herein be described in detail at least one preferred embodiment of the invention with the understanding that the present disclosure is to be considered as an exemplification of the principles of the present invention, and is not intended to limit the broad aspects of the present invention to any embodiment illustrated. It will therefore be understood that what is illustrated is set forth for the purposes of example, and should not be taken as a limitation on the scope of the present invention.

FIG. 1 illustrates a rapid change chuck adapter system 10 in accordance with at least one embodiment of the present invention. The rapid change chuck adapter system 10 comprises: a chuck adaptor 100 configured to operationally couple a chuck 200 to a collet 300.

The chuck may be part of a CNC manufacturing device (not shown), such as a mill or lathe, operative to machine parts from stock material in accordance with a manufacturing process. The chuck may be any such chuck known to those of ordinary skill in the art. In some embodiments, the chuck may be a hydraulic chuck. The general structural and operative details of the such chucks are known to those of ordinary skill in the art and, for the sake of efficiency, will only be described to the extent necessary to illustrate the principles of the invention to those of ordinary skill in the art.

As shown in FIG. 1, the chuck may comprise a chuck body 210 and one or more chuck teeth (not shown). The chuck body may include one or more grooves 220 adapted to engage the chuck teeth, such that the chuck teeth may be radially advanced and retracted to engage the stock material during normal operation of the chuck (i.e., without the chuck adaptor). In at least some embodiments, the chuck includes three or four chuck teeth and a corresponding number of grooves.

The chuck teeth are preferably removable from the chuck body. In at least some embodiments, the chuck teeth may be removed and replaced with alternative chuck teeth adapted (e.g., sized, shaped, etc.) to engage different sized/shaped stock material. As FIG. 1 illustrates the chuck in operation with the chuck adaptor 100, the chuck is shown with the chuck teeth removed.

The collet 300 may comprise: a plurality of radially dispersed collet jaws 310 defining a substantially cylindrical inner surface 312 and an outer surface 314 that is conical at a distal portion 316 of the collet and is cylindrical at proximal portion 318 of the collet. The collet jaws 310 may be operatively configured so as to close radially-inward when subjected to a radially inward force (e.g., by the chuck adapter)—and to open radially-outward when the radially inward force is removed.

The collet 300 may further comprise a threaded portion 320 for securely coupling the collet to the chuck adaptor, such that via the coupling the collet may be advanced/retracted axially within the chuck adaptor, such advancing/retracting working to apply/release the radially-inward force. The general structural and operative details of collets are known to those of ordinary skill in the art and, for the sake of efficiency, are only herein described to the extent necessary to illustrate the principles of the invention to those of ordinary skill in the art.

Figure 2B:
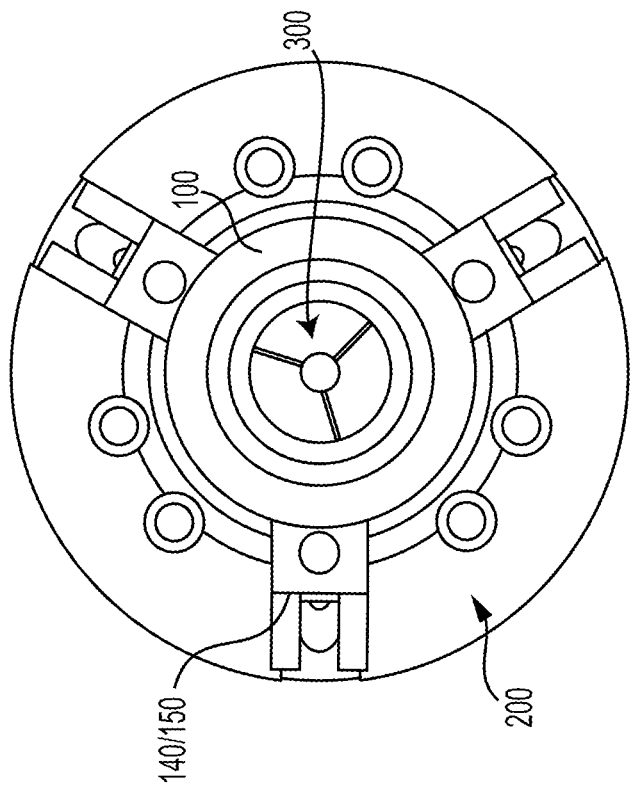
FIG. 2B is a rear view of the exemplary chuck adapter and hydraulic chuck in accordance with one or more aspects of the present invention.
Figure 2A:
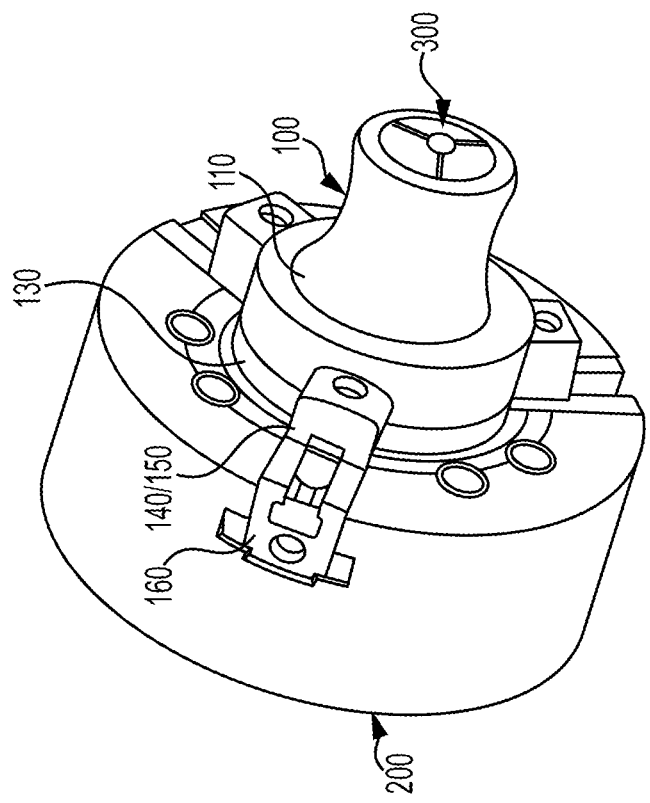
FIG. 2A is a perspective view of the exemplary chuck adapter and hydraulic chuck in accordance with one or more aspects of the present invention.

As shown in FIGS. 1-2, the chuck adaptor may comprise: a main housing 110, a puller plate 120, and a cover plate 130, a plurality of adapter jaws 140, and a pusher 150 (i.e., a bump member), and an H-nut 160.

The main housing is configured to operatively engage the collet therein, and may be constructed of hardened 1045 tin steel. An exemplary main housing is schematically shown, for example, in FIG. 3.

The main housing may comprise a sleeve 111 that defines an aperture 112 into which the collet may be inserted so as to be substantially coaxial with the main housing. The sleeve is configured to apply/release the radially-inward force to the collet, when the collet is advanced/retracted axially within the aperture, so as to cause collet jaws to close/open, as discussed.

Figure 3:
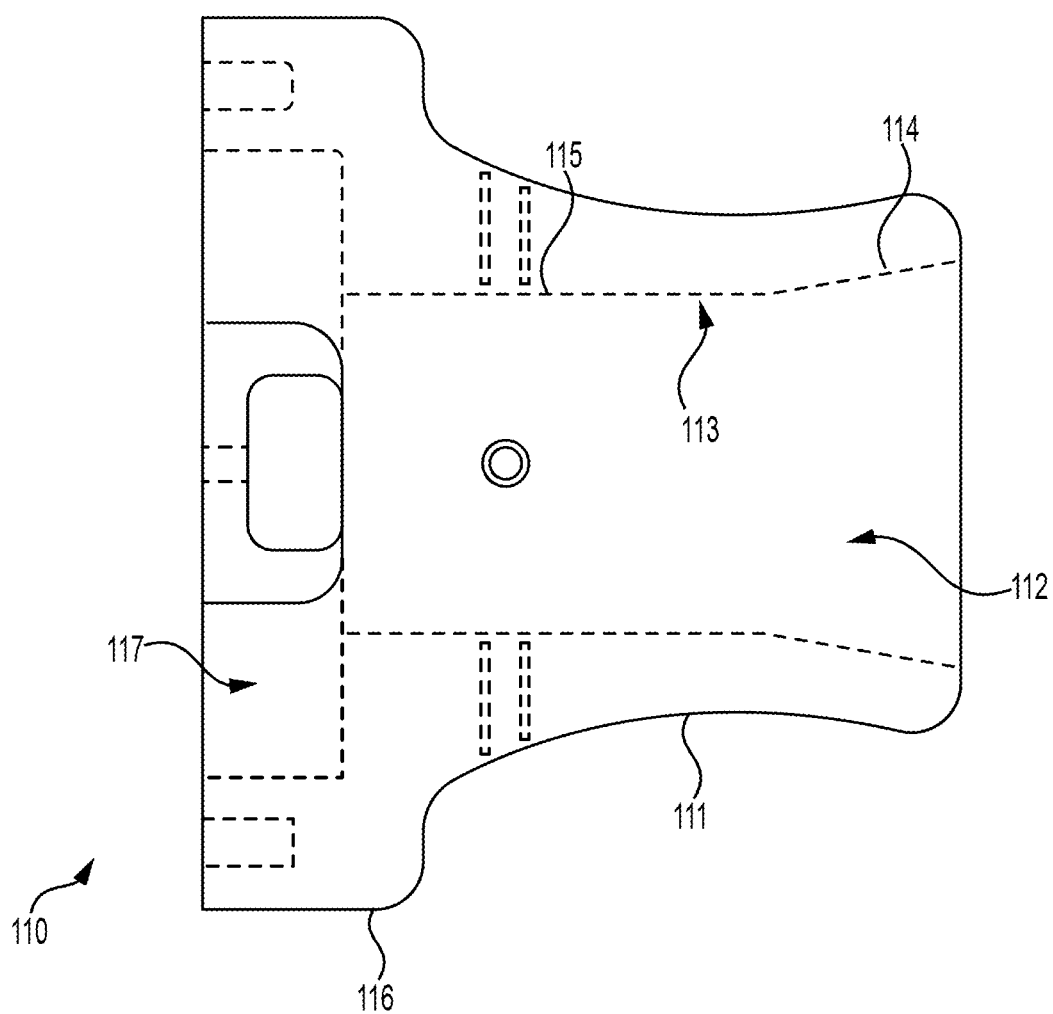
FIG. 3 is a schematic view of an exemplary main housing in accordance with one or more aspects of the present invention.
Figure 6:
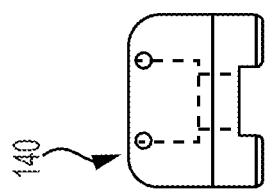
FIG. 6 is a schematic view of an exemplary adapter jaw in accordance with one or more aspects of the present invention.

Accordingly, as shown in FIGS. 1-3, the aperture may be defined by an inner surface 113 of the sleeve that is conical at a distal portion 114 of sleeve and is cylindrical at a proximal portion 115 of the sleeve. In at least some embodiments, the distal portion may have an opening angle of approximately 10 degrees, as measured from the axis of the main housing. In at least some embodiments, the opening angle is such that the distal portion of the sleeve substantially mates with the distal portion of the collet outer surface.

The main housing may further comprise a base 116 defining a base chamber 117 configured to house the puller plate therein, such that the puller plate can advance/retract axially within the base chamber along the axis of the main housing.

The puller plate 120 is configured to couple to the collet through the aperture of the main housing. In particular, the puller plate may couple to the collet at the threaded portion of the collet, so as to cause the collet to advance/retract axially with its own advancement/retraction within the base chamber. An exemplary puller plate is schematically shown, for example, in FIG. 4.

Figure 4:
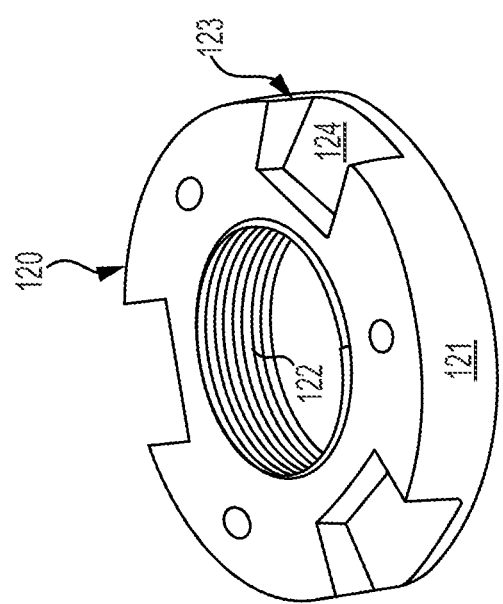
FIG. 4 is a perspective view of an exemplary puller plate in accordance with one or more aspects of the present invention.

As shown in FIGS. 1-2 and 4, the puller plate may comprise a substantially cylindrical ring shaped body 121 with a threaded inner surface 122 configured to couple to the collet, as described herein. In some embodiments, the puller plate may be constructed of hardened 1045 steel.

The puller plate may further comprise a plurality of grooves 123, each configured to receive a corresponding pusher 150 therein, such that the outward/inward radial movement of the pushers cause the axial advancement/retraction of the puller plate within the base chamber. Accordingly, the grooves may have an angle surface 124 against which a corresponding angled surface 154 of the corresponding pusher may push, as described further herein. In some embodiments, the puller plate may include a guiding shaft 125 configured to align the puller plate with the base.

Returning to FIG. 1, the cover plate 130 is configured to securely couple to the main housing so as to provide a stationary surface 131 enclosing the base chamber of the main housing. In some embodiments, the cover plate may be constructed of hardened 1045 steel.

As shown in FIG. 1, one or more spring elements 132 may be positioned between the stationary surface and the puller plate. The spring elements may be configured to provide a spring force to the puller plate in the axial direction so as to cause the puller plate to advance axially in the direction of the collet. In other words, the spring force may be a restoring force that counteracts the axial force of the pushers on the puller plate. Accordingly, as the pushers retract radially outward, thereby lessening the axial retraction force they apply, the spring force causes the puller plate to advance axially in the direction of the collet. By contrast, as the pushers advance radially inward, thereby increasing the axial retraction force they apply, the spring force is overcome and the puller plate retreats. In some embodiments, the spring elements may be between 0.875 and 1.0 inches long, and further may be made of chrome silicon steel.

Turning now to FIGS. 1 and 5-7, exemplary pushers 150 and adapter jaws 140 are shown schematically.

As discussed, the pushers are configured to cause the puller plate to axially advance/retreat via the corresponding radially outward/inward movement of the pushers. Accordingly, each pusher comprises a pusher body 152 with an angle surface 154 adapted to push against the corresponding angled surface 124 of the puller plate. In at least some embodiments, the pushers access the puller plate via corresponding apertures 118 in the base of the main housing.

The pushers may each be coupled to a corresponding adapter jaw. In some embodiments, the pushers are bolted to the adapter jaws via screws 142. The adapter jaws may, in turn, each be coupled to a corresponding H-nut. In some embodiments, such coupling is via screws 144.

Figure 7:
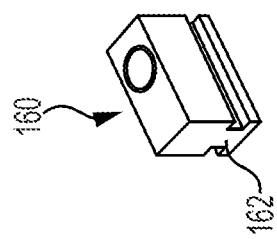
FIG. 7 is a perspective view of an exemplary H-nut in accordance with one or more aspects of the present invention.
Figure 5:
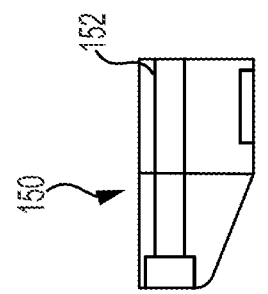
FIG. 5 is a schematic view of an exemplary pusher in accordance with one or more aspects of the present invention.

As shown in FIG. 7, the h-nut may have a tongue-and-groove portion 162 configured to operably couple the h-nut to the groove of the chuck body in place of the chuck teeth. Such coupling may be further facilitated by u-clamp 164.

In operation, the replacement of the chuck teeth by the chuck adapter causes the normal operation of the chuck to move the H-nuts radially outward/inward (instead of moving chuck teeth outward/inward), which movement translates through the adapter jaws to the pushers. Accordingly, the pushers are moved outward/inward radially, in turn causing the corresponding retraction/advancement of the puller plate and collet, so as to thereby cause the collet to close/open.

It will be understood that the mechanism to engage and grip the stock material via the collet may be functionally reversed without departing from the scope of the invention. For example, the push/pull functions of the puller plate 120 and the pushers 150 can be reversed such that it is the collet that remains stationary while the sleeve moves axially. One of ordinary skill in the art would understand the same principles disclosed here to apply equally to such an embodiment.

Figure 8:
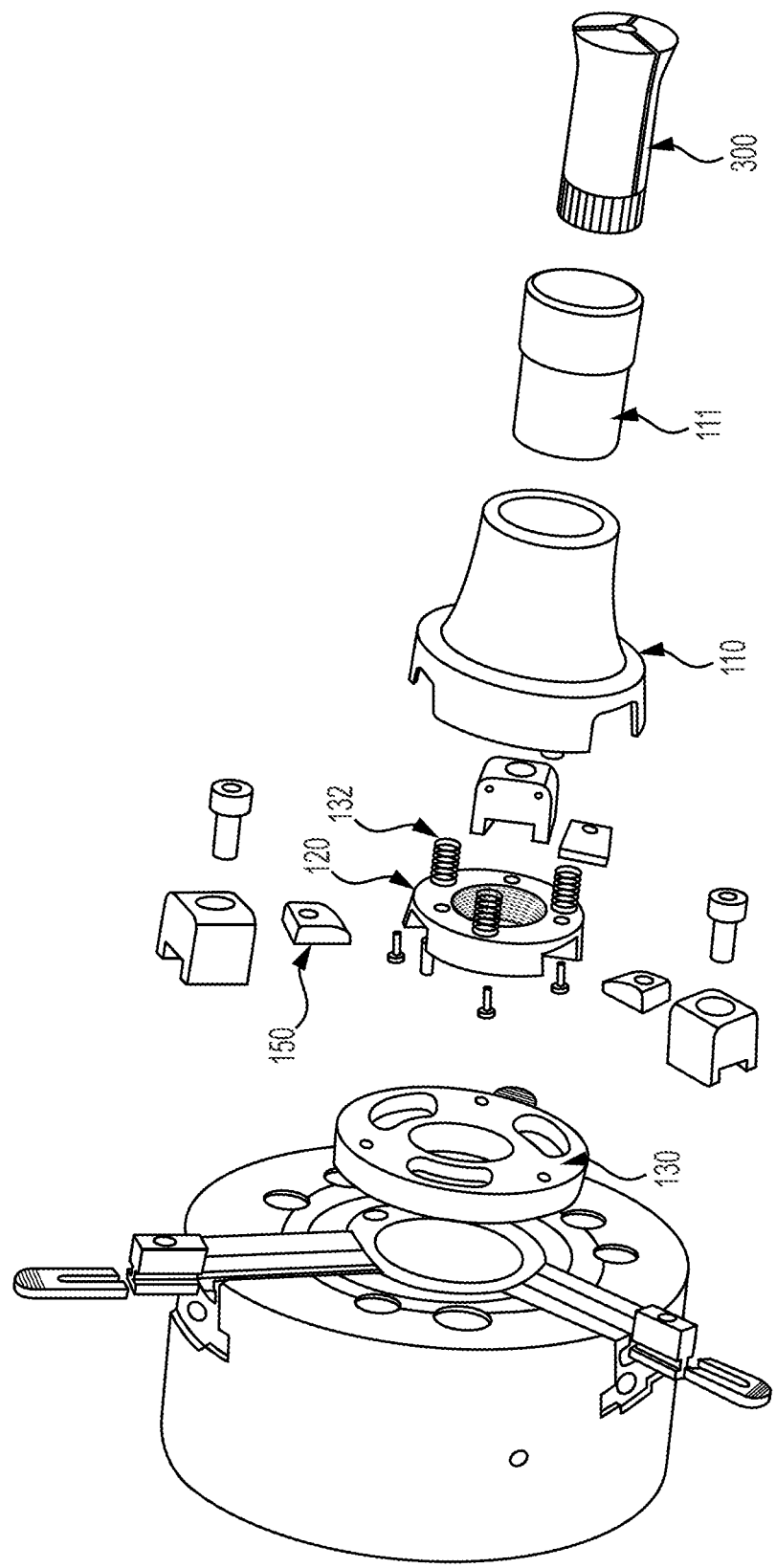
FIG. 8 is a schematic exploded view of an exemplary chuck adapter and hydraulic chuck in accordance with one or more alternative aspects of the present invention.

FIG. 8 schematically illustrates at least one such embodiment, in which the puller plate 120 may be reverse oriented so as to become a pusher plate 120', and the pushers 150 may be reverse oriented so as to become pullers 150' (i.e., bump members). In such an embodiment, the pusher plate 120' may be fixed to an inner sleeve 111' so as to cause the inner sleeve 111' to move axially therewith interior to the main housing 110. Moreover, the collet 300 may be instead secured to the cover plate 130 independent of the pusher plate 120'. Accordingly, in operation, the collet 300 remains stationary with respect to the main housing 110 and the cover plate 130, while the pusher plate 120' pushes the inner sleeve 111' axially in the direction of the collet 300, so as to cause the collet jaws to close. In addition, the spring elements 132 may be relocated to between the base 116 and the pusher plate 120', so as to provide the restoring spring force to open the collet jaws.

Accordingly, via the disclosed invention, machine operators are able to quickly change between different diameters of metal bars during their production runs. This is achieved by attaching the chuck adaptor to the existing chucks rather than removing the entire chuck and replacing it with a collet.

The objects, advantages and features described in detail above are considered novel over the prior art of record and are considered critical to the operation of at least one embodiment of the present invention and to the achievement of at least one objective of the present invention. The words used in this specification to describe these objects, advantages and features are to be understood not only in the sense of their commonly defined meanings, but also to include any special definition with regard to structure, material or acts that would be understood by one of ordinary skilled in the art to apply in the context of the entire disclosure.

As used herein, the terms "a" or "an" shall mean one or more than one. The term "plurality" shall mean two or more than two. The term "another" is defined as a second or more than two. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C. An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

Moreover, the definitions of the words or drawing elements described herein are meant to include not only the combination of elements which are literally set forth, but all equivalent structures, materials or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements in a claim without departing from the scope of the present invention.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted in conjunction with the appended claims.

The invention claimed is:

1. A rapid change chuck adapter system, comprising:
   a chuck with removed chuck teeth; and
   a chuck adapter that is removably attachable to the chuck in place of the removed chuck teeth, wherein the chuck adapter comprises:
      a cylindrical ring plate with an aperture that receives and secures a collet therein, and an axial surface having a plurality of grooves, each groove holding a bump member such that radial movement of the bump members within the grooves causes the ring plate to move axially against a spring provided restoring force,
   wherein operating the chuck as if the chuck teeth were not removed operates the collet via the chuck adapter.

2. The rapid change chuck adapter system of claim 1, wherein the chuck adapter comprises:
   adapter jaws configured to translate the operation of the chuck to the bump members so as to operate the collet.

3. The rapid change chuck adapter system of claim 2, wherein the cylindrical ring plate comprises a puller plate that engages with the adapter jaws and the collet, such that radial movement of the adapter jaws translates to axial movement of the puller plate, which in turn translates to axial movement of the collet, the rapid change chuck adapter system further comprising:
   a main body having a sleeve configured to operatively receive the collet such that the axial movement of the collet with respect to the sleeve operates the collet to open and close.

* * * * *